Feb. 1, 1938.  A. W. HERRINGTON  2,107,073
MOTOR VEHICLE DRIVE STEERING WHEEL AXLE STRUCTURE
Filed April 28, 1937
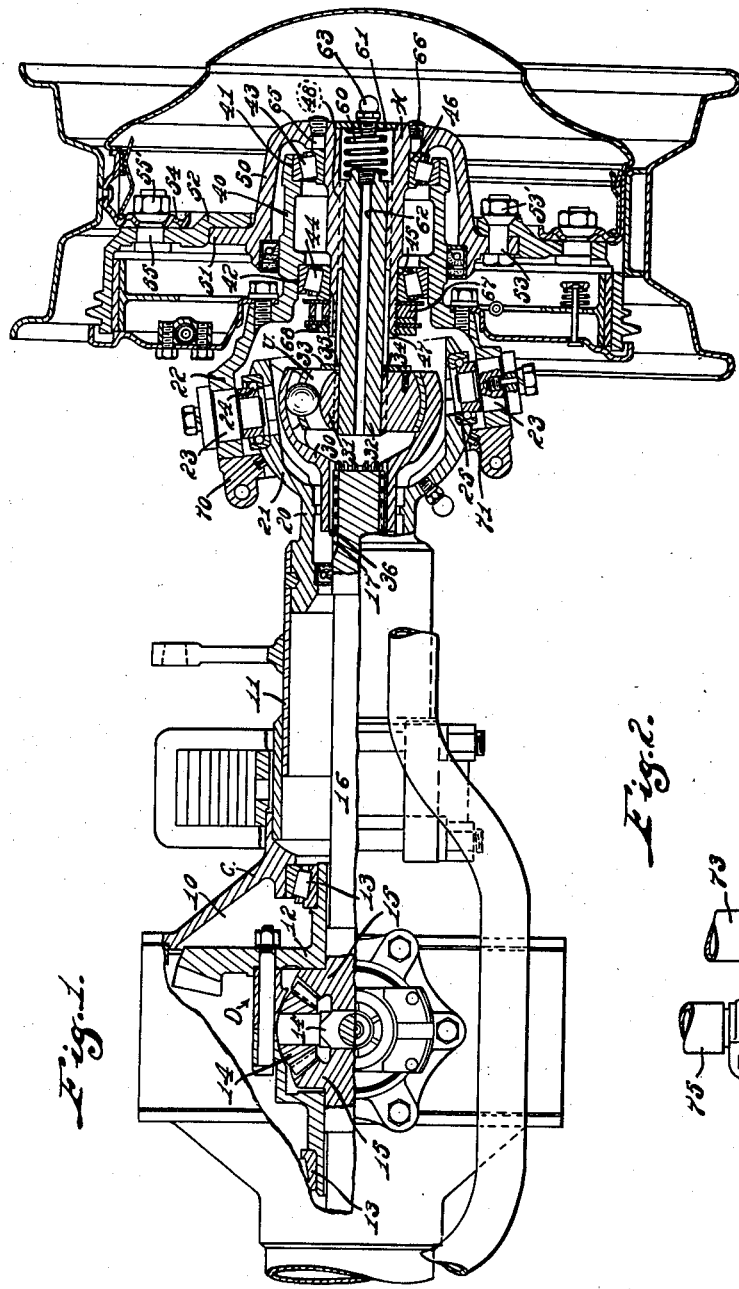
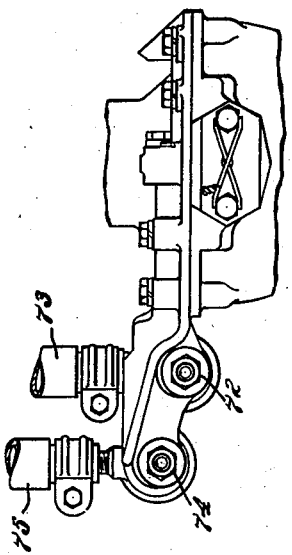
INVENTOR.
Arthur W. Herrington,
BY
Hood & Hahn
ATTORNEYS.

Patented Feb. 1, 1938

2,107,073

UNITED STATES PATENT OFFICE 2,107,073

MOTOR VEHICLE DRIVE STEERING WHEEL AXLE STRUCTURE

Arthur W. Herrington, Indianapolis, Ind., assignor to Marmon-Herrington Company, Inc. Indianapolis, Ind., a corporation of Indiana Application April 28, 1937, Serial No. 139,387

2 Claims. (Cl. 180—43)

One object of my invention is to produce an improved driven steering wheel and supporting axle structure which will be sturdy and can be produced at low cost, wherein the necessary universal joints of the live axle structure, as to established alignment with or centralized upon the trunnion axes of the pivoted wheel carrying casing elements, will be automatically maintained independent of the wear or proper adjustment of the wheel bearings.

Another object of my invention is to provide an improved hub for traction wheels of motor vehicles, particularly heavy motor vehicles, and more particularly power driven wheels, wherein the brake drum and wheel are so connected to the hub that the wheel may be readily removed without disturbance of the brake drum and wherein the brake drum, together with the wheel, may be removed from the hub as a unit.

The accompanying drawing illustrates my invention:

Fig. 1 is an axial section of a structure embodying my invention; and

Fig. 2 a fragmentary plan of parts thereof.

In the drawing C indicates the main shell or casing element of the axle, said shell having a central compartment 10, within which the differential gearing D is mounted, and oppositely extended tubular portions 11, 11.

The differential D comprises ring gear 12 supported at each end by bearings 13, 13, planetary gears 14 carried by the ring gear, and sun gears 15, 15, each of which is preferably integral with an outwardly extending shaft section 16 provided at its outer end with splines 17. Engagement of gears 15 with ring gear 12 prevents axial movement of the elements 15—16 in one direction and engagement of said elements 15—16 with the carrier 14' of the planetary gears 14 prevents axial movement of said elements 15—16 in the other direction.

Mounted in the outer end of each casing element 11 and enclosing the splined end 17 of shaft 16 is a shell 20 having a ball end 21 over which is sleeved the inner end of a shell 22 provided with upper and lower inwardly-projecting and outwardly-withdrawable trunnion pins 23, 23 which enter anti-friction bearings 24 carried in upper and lower pockets 25 in the ball 21 of shell 20.

A constant velocity universal joint U, of well known form, comprises an outer element 30, which is splined and freely axially movable upon the splined end of shaft 16, and an inner member 31 within which is splined shaft section 32, said shaft section being normally axially locked within element 31 by means of retaining ring 33 provided at one point with an inwardly projecting finger 34 which may be axially movable in one of the splines of shaft 32 and, before fastening to element 31, may be turned slightly into a circumferential groove 35 formed in shaft 32.

A stop ring 36 carried by shaft 16 forms an abutment for element 30 of the universal joint to properly position said element 30 relative to the axis of the trunnions 23.

Shell 22 is provided with an outwardly extending tubular portion 40 within which is formed an outwardly-presented bearing pocket 41 and an inwardly-presented bearing pocket 42, said pockets respectively receiving the outer races of anti-friction bearings 43 and 44. The inner races of bearings 43 and 44 are respectively seated upon axially spaced seats 45 and 46 formed upon the exterior of a tubular or sleeve-like portion 47 of the wheel hub H, the interior of said sleeve, at 48, being splined to mate with and be freely axially movable upon the splined exterior of shaft section 32.

The hub H also comprises a cup-like portion 50 which is integral with the sleeve 47 and envelops the outer end 40 of shell 22. Cup 50 carries an external peripheral flange 51 to which the wheel and brake drum are secured, said flange lying in a plane between the planes of bearings 43 and 44.

A brake-drum carrying-ring 52 is secured by bolts 53 and nuts 53' to the outer face of flange 51, and a wheel-rim carrying-ring 54 is removably secured to the outer face of the brake-drum-ring by bolts 55 and nuts 55'. This construction permits the independent removal of the wheel, without disturbing the brake-drum, and permits the removal of the wheel and brake-drum, as a unit, without disturbing the connection between the wheel and the brake-drum.

Within the outer end of the bore of sleeve 47 is a compression spring 60 which, at one end, abuts upon the outer end of shaft section 32 and at the other end abuts upon the cover plate 61 mounted over the outer end of the bore of sleeve 47. Shaft section 32 is bored axially at 62 to permit injection of lubricant into the interior of the universal joint U either by a fitting 63 carried by plate 61 or by a similar fitting (not shown) mounted in the outer end of bore 62, in which case plate 61 may be made readily removable or perforated to permit access to said fitting.

Hub H is perforated at two or more points, as indicated at 65, to permit access to the inner race of bearing 43 to drive it axially from its seat, said perforations being normally closed by removable plugs 66.

The inner race of bearing 44 is engaged by an adjusting nut 67 threaded upon the inner end of sleeve 47 and held in adjusted position by a retaining element 68, of well known form, also mounted upon the inner end of sleeve 47. Shaft section 32 being freely axially movable within sleeve 47 and element 30 of the universal joint U being freely axially movable on the splined end 17 of shaft 16, spring 60 constantly biases the universal joint U to a centralized position relative to the axes of trunnions 23, yet permits outward movement, in case of need, so that the universal joint may automatically centralize itself relative to the trunnion axis, independent of the condition of the wheel bearings 43 and 44.

Shell 22 is supplemented at its inner end by a two-part retaining ring 70 having an annular packing 71 engaging the surface of ball 21. At opposite ends of the axle structure each ring 70 provides a pivotal connection 72 for the connecting stretcher-rod 73, and one of said rings 70 provides a pivotal connection 74 for the steering-rod 75.

I claim as my invention:

1. A driven steering-wheel axle-structure comprising, a main casing having a middle compartment and oppositely-extended tubular portions, a differential gearing mounted in said compartment and having an axially-restrained live shaft journalled within one of said tubular portions, a wheel-carrying shell pivotally connected with said tubular portion of the main casing, a wheel journalled on said shell and having an axially-splined hub; and a universally jointed live-shaft structure having one end splined to the outer end of said live-shaft and freely axially movable outwardly relative thereto, and the other end splined to the hub of said wheel and freely axially movable relative thereto.

2. A driven steering-wheel axle-structure comprising, a main casing having a middle compartment and oppositely-extended tubular portions, a differential gearing mounted in said compartment and having an axially-restrained live shaft journalled within one of said tubular portions, a wheel-carrying shell pivotally connected with said tubular portion of the main casing, a wheel journalled on said shell and having an axially-splined hub; a universally jointed live-shaft structure having one end splined to the outer end of said live-shaft and freely axially movable outwardly relative thereto, and the other end splined to the hub of said wheel and freely axially movable relative thereto; and a spring interposed between said last-mentioned end and the hub of the wheel to bias said universally-jointed structure inwardly.

ARTHUR W. HERRINGTON.